Sept. 30, 1947.  W. M. ALBRECHT  2,428,060

CHAIN JOINT

Filed Aug. 7, 1944

INVENTOR
WALTER M. ALBRECHT

BY
George A. Evans
ATTORNEY

Patented Sept. 30, 1947

2,428,060

UNITED STATES PATENT OFFICE 2,428,060

CHAIN JOINT

Walter M. Albrecht, Milwaukee, Wis., assignor to Chain Belt Company, Milwaukee, Wis., a corporation of Wisconsin Application August 7, 1944, Serial No. 548,453

3 Claims. (Cl. 74—256)

This invention relates to the pivot joint between links of chain such as are used for power transmission. It is an object of the present invention to provide a chain pintle in which there is less friction between the chain pin of one link and the bushing or pin journal of an adjacent link, and in which shocks occurring during the transmission of loads may be distributed over the contacting surfaces in a manner to prevent undue stresses on the chain parts.

More specifically, it is an object of the present invention to provide an improved sprocket chain in which there is rolling instead of sliding friction between the pin and bushing surfaces through the provision of roller bearings therebetween. A further object is to provide a pin and bushing so shaped and arranged with respect to the roller bearing that the latter may be relieved of the heavier or shock loads which occur, but will nevertheless transmit the normal, steady loads in an improved manner.

Another object of the invention is to provide a chain link in which there is a transverse pin receiving structure of such length that the pin of an adjacent link is subject to beam load when extending therethrough and its ends connected to the side bars of an adjacent link, and in which the central portion of the structure contains roller bearing members having improved resistance to bearing wear while the ends of the structure are disposed to withstand stresses occurring during bending of the pin when subject to abnormal loads.

In the accompanying drawings the invention is illustrated in what is commonly known as offset side bar chain, but it will be appreciated that the invention may be applied to various types of chain such as straight side bar chain, block link chain, and in fact almost any chain in which there is a hinge joint or pintle between the articulating links.

Referring to the drawings.

Figure 1:
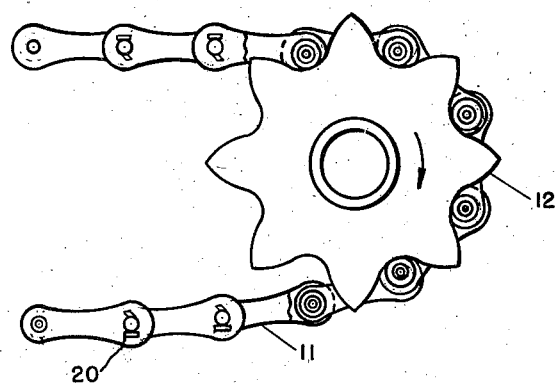
Figure 1 is an assembly of chain links such as might be employed with the invention.

In the drawings, the numeral 11 represents generally the offset links which when assembled as illustrated make up the chain, the links being adapted to flex when trained over a sprocket such as is designated by the numeral 12.

Each link 11 is composed of side bars 13 which are offset in the plane of the link with the larger end of the link connected by a pin 14 and the smaller end connected by a bushing 15 which serves as a journal for the pin of an adjacent link. To this end the side bars are apertured to accommodate the connecting parts, and rotation of the pin and bushing in their respective apertures is prevented by a lock or press fit connection. There is sufficient clearance 16 between the side bars at the larger end of one link and the side bars at the smaller end of the adjoining link to permit easy flexing of the links when passing over the sprockets. There is, however, considerable sliding friction between the front or wearing side of the pin and the bushing as the chain flexes under tension.

In the drawings the bushing 15 is shown with a force fit in the two opposed side bars 13, thereby making a rigid, unitary link structure and a roller 17 may be disposed over the bushing 15 and between the side bars 13 in order to improve sprocket action.

With this construction, the chain links are assembled by registering the holes at the open end of one link with the hole extending through the bushing of another link and the pin 14 is driven through the aligned apertures so that the pin head 18 may register against the outer side of one of the side bars and the opposite end 19 may extend through the other side bar. A cotter 20 is inserted through a transverse aperture in the extended portion 19 of the pin to prevent the pin from drifting axially of the bushing. The pin may also be force fitted in the side bar apertures or other locking means may be employed to prevent the pin from turning with respect to the outer side bars.

Disposed between the bushing 15 and the pin 14 and forming a bearing for the pin are a plurality of rollers 21 of relatively small diameter and preferably of a length sufficiently shorter than the length of the pintle so that two or more sets of rollers may be disposed in end-to-end relation between the surfaces of the pin and bushing.

Figures 2, 3:
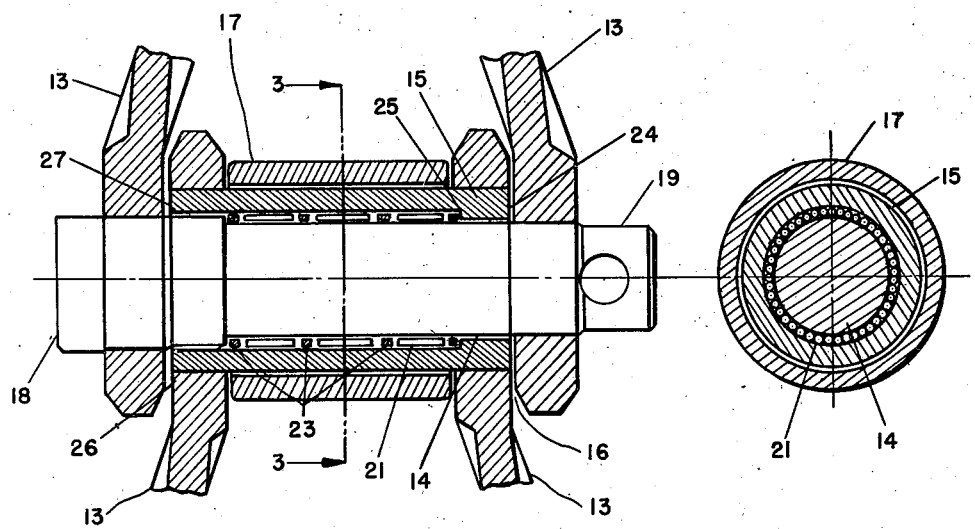
Figure 2 is an enlarged plan view in section of the chain joint.
Figure 3 is a section taken on the line 3—3 of Figure 2.
Figure 4:
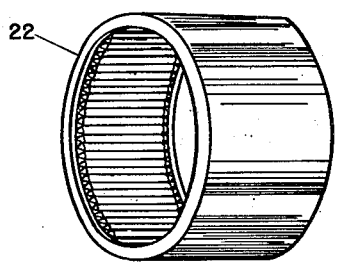
Figure 4 is a perspective view of a bearing with an outer race such as may be inserted in the pintle to make a somewhat modified construction.

The rollers 21 may be mounted directly between the pin and bushing as illustrated in Figure 2 so that they contact the inner surface of the bushing and the outer surface of the pin, or they may be mounted in outer races 22, such as are illustrated in Figure 4 and the races then pressed into the bushing. There is sufficient clearance between the pin and the rollers so that the pin may bend under its beam loading without compressing the rollers on the back side of the pin. With the arrangement shown in Figure 2, the rollers are not tightly packed around the pin but there is sufficient clearance between the individual rollers of a set so that they may freely roll, thereby greatly reducing friction between the front side of the pin and the bushing.

When the rollers are mounted around the pin as shown in Figure 2, spacer rings 23 are disposed between the ends of the various sets of rollers and also between the outer sets and the retaining shoulders on the pins and bushings, so as to confine them against movement axially of the pin. Where the rollers are already mounted in a bearing race 22, the ends of the races, which journal the needle points of the rollers serve the same function.

The roller bearing area does not extend for the full length of the bushing, the bushing bore at one end, as at 24, being reduced for a distance slightly less than the thickness of the side bar which retains the bushing, and the two diameters of the bore are connected by a radial shoulder 25 which prevents end displacement of the rollers or roller races.

The rollers at the opposite end of the bushing are retained by a shoulder 26 on the pin 14 and the diameter of the pin indicated at 27 extending outwardly from the shoulder 26 is less than the larger diameter of the bushing bore by an amount approximately equal to the clearance between the smaller diameter of the pin and the smaller diameter of the bushing bore at the opposite end of the pintle.

The provision of a bushing having two inside diameters and a pin having two outside diameters makes it possible to mount the bearing races 22 in the bushing and then to insert the pin through the bushing thereby completing the assembly of the pintle joint and retaining the roller bearings against axial displacement.

The clearances between the smaller diameter of the bushing bore and the smaller diameter of the pin and also the clearances between the larger diameter of the pin and the larger diameter of the bushing or such that under a shock load or under an overload, the pin may bend and make contact at 24 and 27 with the bushing surfaces which enclose it, and the roller bearings will be spared the resulting overload. When the shock or overload is released and the normal operating load is resumed, the pin again becomes free of the bushing ends, and the rollers 21 assume the entire load. Consequently as the joints flex under normal loads there will be rolling friction between the pintle elements which reduces wear on the pin and bushing.

The amount of clearance between the pin and the ends of the bushing, which is exaggerated in Figure 2 for purpose of illustration, may vary with the size and type of chain involved. Actually the amount of clearance will be of the order of only a few thousandths of an inch even with the largest types of chain now employed for power transmission. When the chain is under normal loads, the pin makes contact with the rollers on the wearing side in the manner illustrated in the drawings, the ends of the bushings on the same side of the pin being free of the pin to eliminate sliding friction, as previously described. When abnormal loads are encountered, meaning shock loads or overloads, such as might deflect the pin because of its beam construction, the ends of the bushing are so disposed with respect to the opposed surfaces of the pin that part of the load may be transmitted through them and the rollers are not required to transmit the entire load.

While the invention illustrates anti-friction rollers in order to produce an improved bearing resistant surface for the portion of the pin disposed within the central portion of the pin-retaining element, different types of structures and materials may be employed without departing from the spirit of the invention in order to obtain greater wear-resistance, provided the end portions of the pin and its aperture are arranged to carry the abnormal loads. In this manner an improved over-all usefulness of the chain results, for those portions of the pintle which are most wear-resistant are spared the additional shock loads which because of their wear-resistant properties they are less able to withstand than parts designed for withstanding shock only. Conversely the end portions which are more shock resistant are arranged so as to be relieved of the wear occurring during the application of normal loads.

The invention having been described, what is claimed is:

1. In a chain link having spaced side bars, a transverse pin-receiving member connected thereby having a pin aperture of sufficient length that the pin of an adjacent link extending therethrough is subject to beam loading when its ends are connected to the side bars of the adjacent link, and roller bearing members disposed between the major central portion of said aperture and the pin, the end portions of the internal surface of said member for a distance of the order of the thickness of the link side bars being disposed to contact the pin when the latter is bowed to thereby relieve the bearing members of the joint from the loads creating such bending forces.

2. In an articulating chain, a pintle joint between the bushing of one link and the pin of an adjacent link extending through said bushing, with its ends secured to the adjacent link comprising a plurality of bearing devices disposed between the pin and the bushing to provide rolling friction during articulation of the links, said bearing devices being arranged in the medial portion only of the pintle, the end portions of the pintle being disposed for sliding bearing contact but having sufficient clearances to limit their engagement to periods when the pin is bent due to the imposition of abnormal loads.

3. In an articulating chain, a pintle joint being the bushing of one link and the pin of an adjacent link comprising a plurality of rollers disposed between the pin and the bushing to provide rolling friction during articulation of the links, said rollers extending through the medial portion only of the pintle, and the end portions of the pintle being disposed for sliding bearing contact but having sufficient clearances to limit their engagement to periods when the pin is bent, the diameter of the pin on one side of the rollers being larger than the portion of the pin surrounded by the rollers, and the diameter of the bushing on the opposite side of the rollers being smaller than the portion surrounding the rollers, whereby the chain may be assembled with the rollers in place.

WALTER M. ALBRECHT.

REFERENCES CITED

The following references are of record in the file of this patent:

UNITED STATES PATENTS

| Number | Name | Date |
|---|---|---|
| 569,632 | Garrood | Oct. 20, 1896 |
| 1,517,482 | Young | Dec. 2, 1924 |
| 1,961,134 | Buckwalter | June 5, 1934 |
| 1,922,355 | Byerlein | Aug. 15, 1933 |
| 882,846 | Sachs | Mar. 24, 1908 |